United States Patent [19]

Marshall et al.

[11] Patent Number: 4,817,176
[45] Date of Patent: Mar. 28, 1989

[54] METHOD AND APPARATUS FOR PATTERN RECOGNITION

[75] Inventors: William W. Marshall, Dayton, Ohio; William F. McWhortor, 15928 E. Ocotillo Dr., Fountain Hills, Ariz. 85268

[73] Assignee: William F. McWhortor, Fountain Hills, Ariz.

[21] Appl. No.: 829,702

[22] Filed: Feb. 14, 1986

[51] Int. Cl.$^4$ .................................. G06K 9/36
[52] U.S. Cl. ................................. 382/43; 382/30; 382/34
[58] Field of Search ............... 364/726, 576, 725, 819, 364/826, 827; 382/9, 30, 31, 34, 43–46, 10, 17

[56] References Cited

U.S. PATENT DOCUMENTS

| | | | |
|---|---|---|---|
| 3,760,356 | 9/1973 | Srivastava | 382/30 |
| 3,846,752 | 11/1974 | Nakano et al. | 382/30 |
| 3,930,231 | 12/1975 | Henrichon, Jr. et al. | 382/30 |
| 3,993,976 | 11/1976 | Ginsburg | 382/31 |
| 4,225,850 | 9/1980 | Chang et al. | 382/43 |
| 4,241,329 | 12/1980 | Bahler et al. | 382/17 |
| 4,346,405 | 8/1982 | Yoda et al. | 382/9 |
| 4,513,441 | 4/1985 | Henshaw | 382/43 |
| 4,547,800 | 10/1985 | Masaki | 382/30 |

Primary Examiner—Leo H. Boudreau
Assistant Examiner—J. L. Couso
Attorney, Agent, or Firm—Charles P. Padgett, Jr.

[57] ABSTRACT

A method and apparatus for recognizing an unknown character, pattern, or indicia, or the like as being a particular one of a group of known reference characters, patterns, indicia, or the like. In the preferred embodiment, the system converts scanned and digitized MICR data and uses it to identify the character. The reference characters and the unknown character are Fourier Transformed and various corrections are made for eliminating the absolute amplitude difference from the recognition process, while simultaneously providing a method of correcting for position differences between the reference charcter and the unknown character. Provisions are made for weighting the phase differences proportional to the expected accuracy of the phase data to minimize the effects of noise on the measurement, and for combining the amplitude and phase data to define a single "best match" criteria for the unknown character. The input data is stored in memory and later converted to real and imaginary frequency components through the Fourier Transform process. The real and imaginary parts are converted to amplitude and phase as a function of frequency and both the amplitude and the phase data are corrected for position errors and the like. They are then compared to a set of amplitude and phase data for the group of standard known characters. The particular one of the known reference characters which is closest to the transform of the unknown character is designated as the "best match". The second minimum is located, and the percentage that the best match is better than the second best match is used to determine a margin of error criteria.

27 Claims, 10 Drawing Sheets

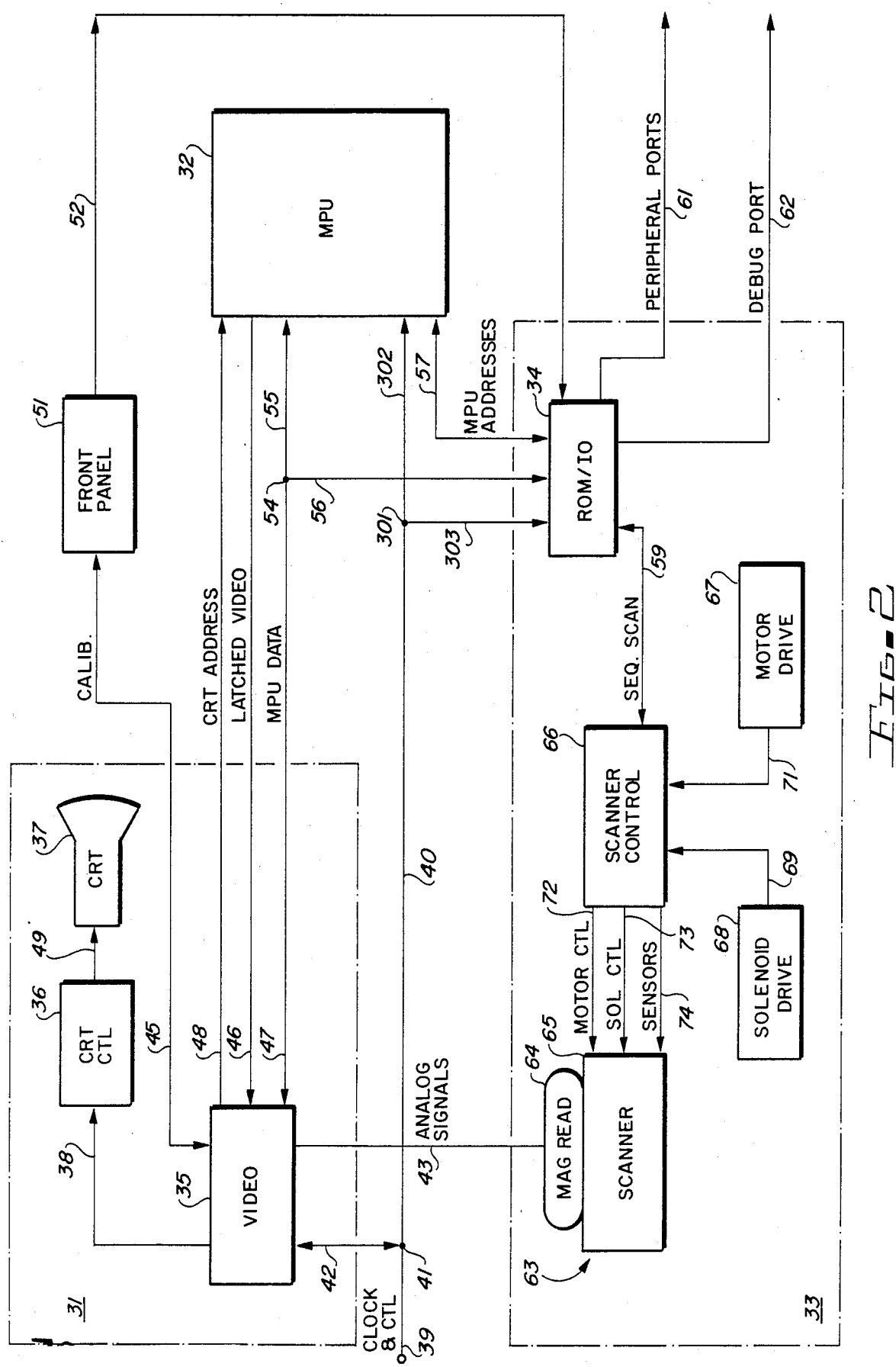

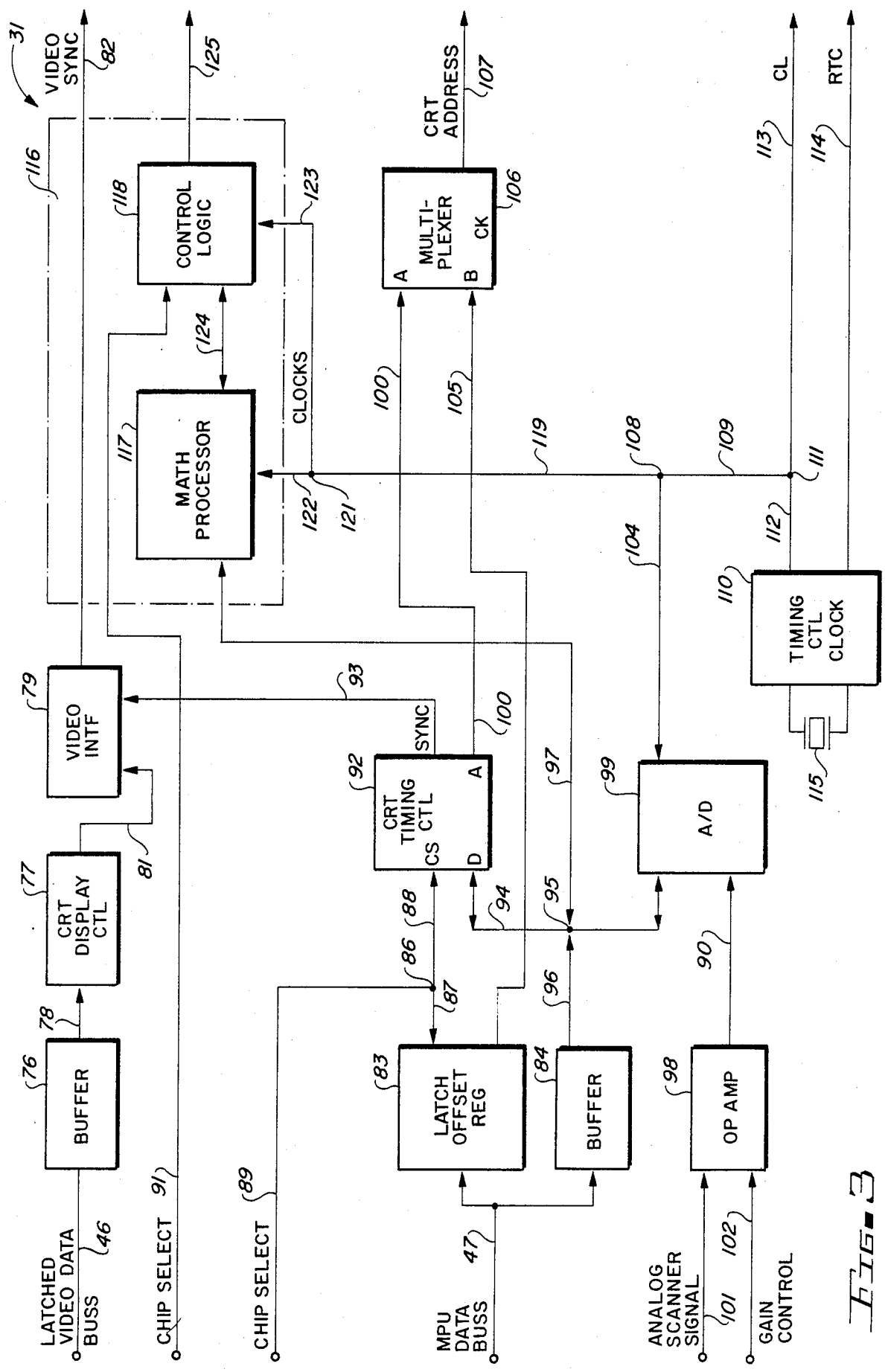

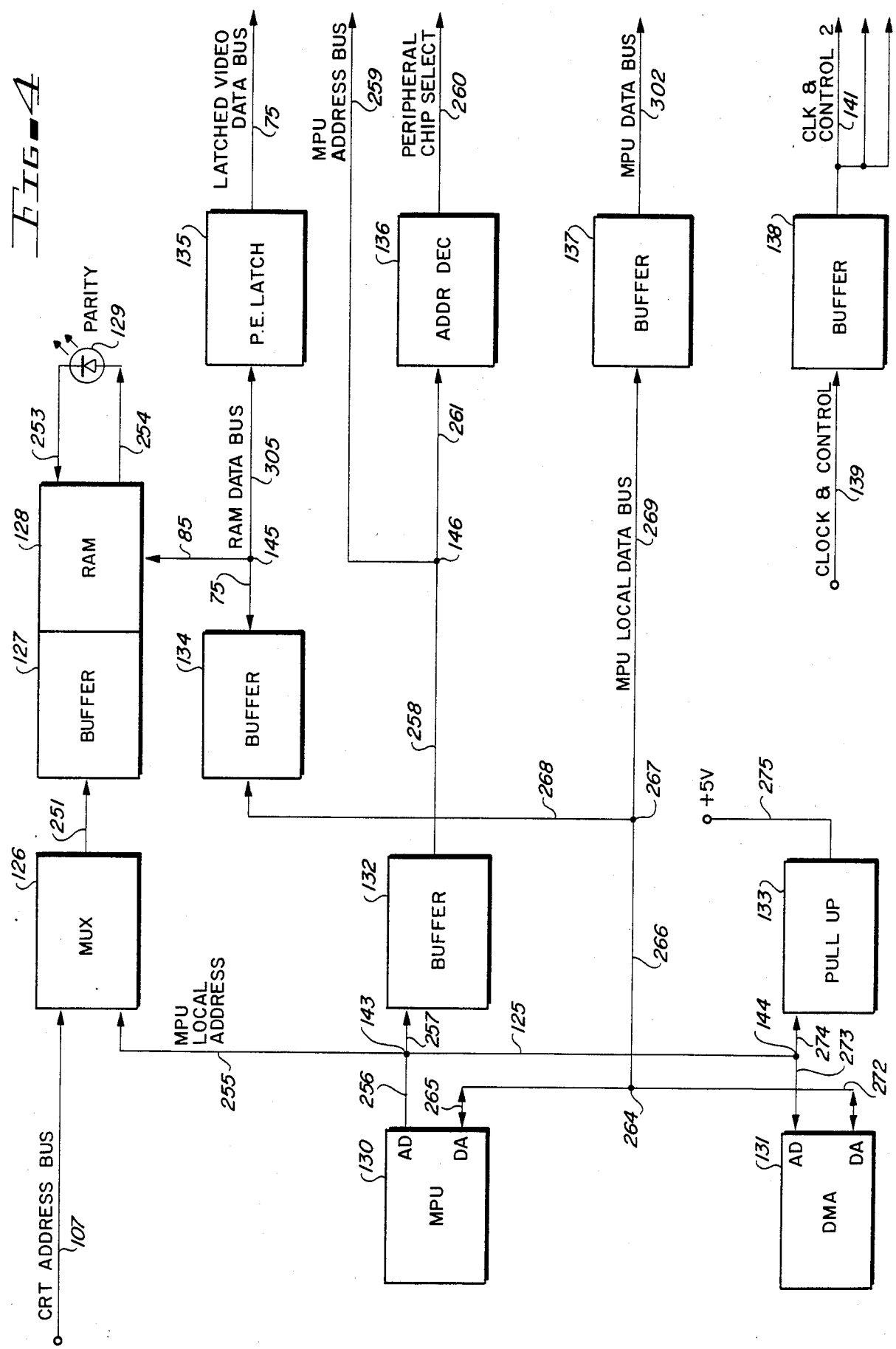

Fig. 9
TABLE OF EQUATIONS

EQUATION #1 $\quad C1_k = \sum_{n=1}^{P} A_{Rk}(n)$

EQUATION #2 $\quad C2 = \sum_{n=1}^{P} A_u(n)$

EQUATION #3 $\quad \emptyset_2(f) = \emptyset_1(f) - 2\pi f \tau$

EQUATION #4 $\quad \tau = -\left[\dfrac{\emptyset_u(f_1) - \emptyset_R(f_1)}{2\pi f_1}\right]$ EQUATION #5 $\quad \emptyset_u' = \emptyset_u(f) + 2\pi f \tau$ EQUATION #6 $\quad PD_k = \sum_{n=1}^{P} \dfrac{A_u(n)}{C2} \cdot \left|\emptyset_u''(n) - \emptyset_k(n)\right|$ EQUATION #7 $\quad \left|\emptyset_u''(n) - \emptyset_k(n)\right| = \Delta P$ EQUATION #8 $\quad R_u(n) = \sum_{m=0}^{N-1} X_m \cos\left(\dfrac{2\pi n m}{N}\right)$ EQUATION #9 $\quad I_u(n) = -\sum_{m=0}^{N-1} X_m \sin\left(\dfrac{2\pi n m}{N}\right)$ EQUATION #10 $\quad A_u(n) = \sqrt{R_u(n)^2 + I_u(n)^2}$ EQUATION #11 $\quad \emptyset_u(n) = \tan^{-1} \dfrac{I_u(n)}{R_u(n)}$ EQUATION #12 $\quad A_u'(n) = A_u(2) \cdot R_k$
$\quad R_k = \dfrac{C1_k}{C2}$ AND $C2 = \sum_{n=1}^{P} A_u(n)$ EQUATION #13 $\quad AD_k = \sum_{n=1}^{P} \left|A_u'(n) - A_{Rk}(n)\right|$ EQUATION #14 $\quad \emptyset_{C1} = \left|\dfrac{\emptyset(n_1) - \emptyset_k(n_1)}{n_1}\right|$ EQUATION #15 $\quad \emptyset_u'(n) = \emptyset(n) - n \cdot \emptyset_{C1}$ EQUATION #16 $\quad \emptyset_{C2} = \left|\dfrac{\emptyset'(n_2) - \emptyset_k(n_2)}{n_2}\right|$ EQUATION #17 $\quad \emptyset_u''(n) = \emptyset'(n) - n \emptyset_{C2}$ EQUATION #18 $\quad SAD = \sum_{k=1}^{NS} AD_k$ EQUATION #19 $\quad SPD = \sum_{k=1}^{NS} PD_k$ EQUATION #20 $\quad M_k = \dfrac{AD_k}{SAD/NS} + \dfrac{PD_k}{SPD/(NS-1)}$ EQUATION #21 $\quad \%\ MARGIN = \dfrac{MIN2 - MIN}{MIN} \cdot 100$

METHOD AND APPARATUS FOR PATTERN RECOGNITION

BACKGROUND OF THE INVENTION

1. Field of the Invention

This invention relates generally to a method and apparatus for determining which of a given set of known reference patterns is the closest match to a particular unknown pattern, and more particularly, to a method and apparatus whereby the Fourier Transform of both the reference pattern and the unknown pattern are computed, corrections are made, and the comparison is used to determine which of the group of known reference patterns is the "best match" for the unknown pattern.

2. Description of Prior Art

The prior art has used many types of systems in an attempt to identify unknown machine-readable characters as being particular ones of a known set of reference characters. For example, in reading magnetic ink character recognition signals (MICR) from MICR-encoded banking documents and the like, the unknown MICR character is scanned and then an equivalent analog electrical signal is generated. This analog electrical signal is digitized and can be stored in a memory for future comparison purposes. The criteria for comparison in the prior art are varied, and many techniques involve the use of a weighted specification reference system, a binary dot scan system, or the potential use of a Haddamard Matrix transform approach for converting both the unknown character and the group of known reference characters prior to attempting to identify a "best match". These systems are either extremely complex, or have an unacceptably low recognition probability, or require extensive processing equipment to perform the mathematical calculations and transforms involved, and hence they are not suitable for reliable, high speed, low cost operations.

Historically, wave form pattern recognition has been accomplished through three primary approaches in the prior art. The first approach is still used in many areas today and is strictly a manual or human recognition system. The second approach in general use today utilizes a specification reference system embodying an inductive delay line which allows a time-based comparison of multiple peak amplitudes referenced to specific peak amplitudes that specify time basis. The third automated approach involves the use of a binary-grid comparison system embodying a linear array of sensors which scan the target signature or pattern to be identified and then time-framed. The presence or absence of signals above a certain threshold determine the pattern, and this pattern is compared statistically to a reference pattern or to a set of reference patterns.

Additionally, Fourier Transforms have been used for signal enhancement in reconnaissance mapping where sensors are used to scan patterns in order to find strong signals at critical spectrum points; and, these isolated signals are then amplified and fed back to enhance the original pattern, but a pattern recognition extension has never been derived from this concept let alone on a commercial basis. Another method used for map enhancement and target discrimination is the Hadamard Transform approach.

SUMMARY OF THE INVENTION

It is an object of the present invention to provide a method and apparatus for analyzing, recognizing and categorizing waveforms, patterns, characters, indicia, or signatures through the use of a Fourier Transform operation.

It is another object of the present invention to provide a recognition technique and defect analysis technique which is relatively insensitive to noise at frequencies not contained in the character to be recognized.

It is still another object of the present invention to provide a recognition technique and defect analysis technique which is very insensitive to variations in signal amplitude.

It is yet another object of the present invention to extend the Fourier Transform approach to include waveform pattern recogniation applications.

It is still a further object of the present invention to provide a Fast Fourier Transform approach or technique where manual recognition systems are currently used for greatly increased speed, accuracy, resolution and flexibility.

It is still another object of the present invention to provide a Fourier Transform approach to pattern recognition which is far superior to the matrix or binary-grid approach currently used due to its superior discrimination capability.

It is still a further object of the present invention to provide a Fast Fourier system for pattern recognition which is easier to implement and has far greater flexibility and speed than prior art approaches.

It is yet another object of the present invention to provide a recognition technique and defect analysis technique which is very insensitive to variations in character position within the data to be analyzed.

It is yet another object of the present invention to provide a character recognition system for use with MICR-encoded documents for providing a "best match" criteria for identifying an unknown character as being one and only one of a list of known reference characters.

It is a further object of the present invention to provide a system for reading and identifying unknown reference patterns by comparing the Fourier Transform of the unknown reference pattern with the Fourier Transform of known reference patterns and accurately determining which of the known reference patterns best matches the unknown pattern.

It is still another object of the present invention to provide an improved method and apparation for pattern recognition systems by providing a system and method which is (1) relatively insensitive to noise frequencies not contained in the character to be recognized; (2) relatively insensitive to variations in signal amplitude; and (3) relatively insensitive to variations in character position within the data to be analyzed.

It is yet a further object of the present invention to provide an improved method and system of pattern or character recognition and identification using Fourier Transform techniques.

It is still another object of the present invention to provide a system for computing values necessary for obtaining a "best match" of an unknown character with a known character in a pattern recognition system.

It is a further object of the present invention to provide a method and apparatus which has the potential of high pattern recognition probability with reasonable confidence levels and false alarm rates.

It is still another object of this invention to provide a method and apparatus for character recognition which functions effectively in a commercial environment with reasonable speeds and at competitive costs.

It is yet a further object of this invention to provide a method of pattern recognition which provides for means of measuring recognition margins and means of adjusting margins to accommodate varying trade-offs in recognition probability and false alarm rates, thereby broadening the potential commercial applications of the method and the system of the present invention.

The present invention teaches a method and apparatus for recognizing an unknown character as being a particular one of a group of known reference characters. In the preferred embodiment, the system converts scanned and digitized MICR data and uses it to identify the character to be recognized. The reference characters and the unknown character are then Fourier Transformed and various corrections are made for eliminating the absolute amplitude difference from the recognition process while simultaneously providing a method of correcting for position differences between the reference character and the unknown character. Provisions are made for weighting the phase differences proportional to the expected accuracy of the phase data to minimize the effects the noise on the measurement, and for combining the amplitude and phase data to define the single "best match" criteria for the unknown character. The input data is stored in memory and later converted to real and imaginary frequency components through the Fourier Transform process. The real and imaginary parts are then converted to amplitude and phase as a function of frequency, and both the amplitude and phase data are corrected for position errors and the like and then compared to a set of amplitude and phase data for the group of standard known characters. The particular one of the known reference characters which is closest to the transform of the unknown character is designated as the "best match" and is used as the value of the unknown character while the second minimum is located and the percentage of the best match is different than the second best match is used to determine a margin of error criteria.

The method of the present invention contemplates a method for recognizing an unknown, machine-readable pattern, character, signature, or the like as one of a group of known reference patterns including providing a group of known reference patterns and computing the Fourier Transform of each of the known patterns. The patterns are corrected for zero difference to the center of each transform known reference pattern and then real and imaginary parts of each Fourier Transform are converted to amplitude and phase form. These are corrected to put the phase angle in the proper quadrature, and the converted Fourier Transformed reference patterns are then stored in a first memory. The amplitude normalization constant is computed for each of the stored Fourier Transformed patterns and the normalization constants are also stored.

The unknown pattern or pattern to be recognized is then scanned an analog electrical signal indicative of the scanned unknown pattern is generated. This analog signal is digitized and temporarily stored in a second memory. The digitized unknown pattern is retrieved from the second memory and the Fourier Transform of the digitized unknown pattern is taken. The value is then corrected to a zero reference at the center of each transformed unknown pattern and the real and imaginary parts of each unknown characters Fourier Transform is converted from real and imaginary parts to amplitude and phase form. These are corrected for proper phase angle and quadrature and stored in the second memory. The amplitude values of the stored unknown pattern are then normalized by multiplying the normalization constant to eliminate differences in amplitude between the unknown pattern and the known reference patterns. The absolute amplitude difference is then computed between the unknown pattern in each reference pattern and the values are corrected for phase alignment error, quadrant error, and then phase difference is weighted by the amplitude of the unknown pattern of each frequency point. The absolute phase difference is then compared between the unknown pattern and the reference patterns and the amplitude and phase differences are summed over all reference patterns. The combined amplitude and phase match values for each reference pattern is then determined in order to weight the amplitude and phase difference equally and by the amount that they are less than the average differences. Lastly, the minimum value is located to identify that particular reference pattern which is the "best match" for the unknown pattern. The second minimum can be located to determine the percentage by which the best match is better than the second best match as a measure of the margin of error criteria.

These and other objects and advantages of the present invention will be more fully understood from studying the claims, the detailed description of the invention, and the drawings, which are briefly described hereinbelow.

BRIEF DESCRIPTION OF THE DRAWINGS

FIG. 2 is a block diagram illustrating the circuit board layout of the recognition system of the present invention;

FIG. 3 is a functional block diagram of the video circuit board of the block diagram of FIG. 2;

FIG. 4 is a functional block diagram of the MPU circuit board assembly of FIG. 2;

FIG. 9 is a Table of Equations used in the Specification and Claims.

DETAILED DESCRIPTION OF THE PREFERRED EMBODIMENT

Figure 1:
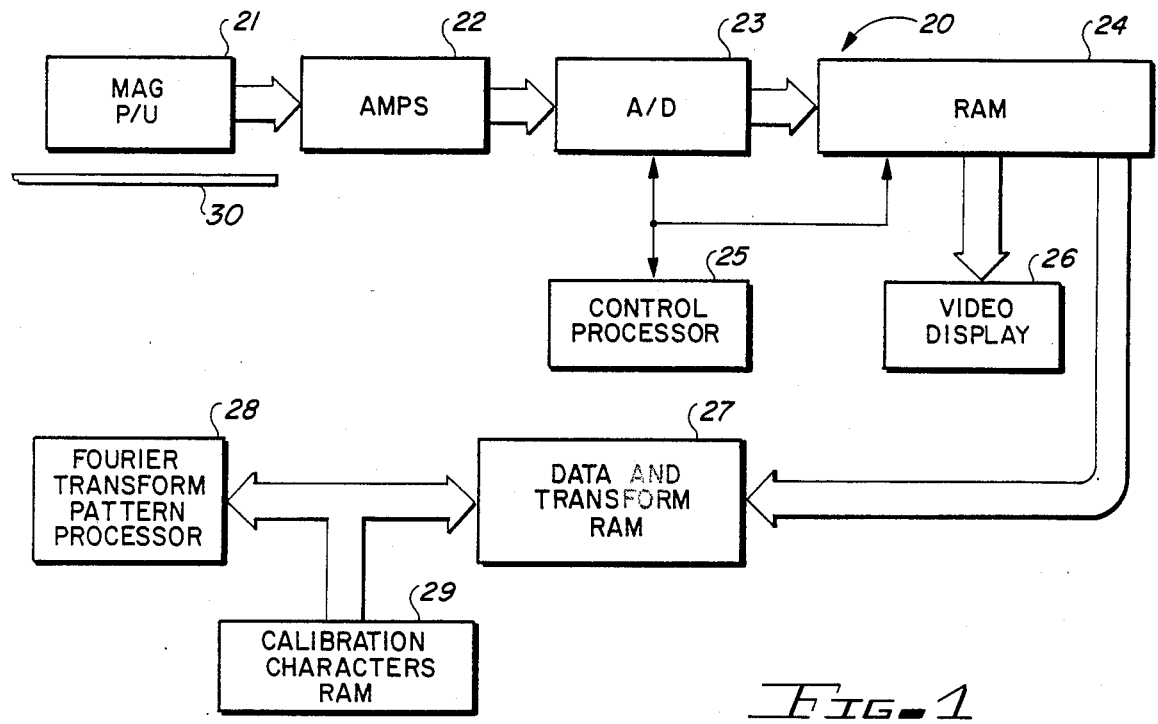
FIG. 1 is a functional block diagram of the recognition system of the present invention.

FIG. 1 is a functional block diagram illustrating the recognition system of the present invention. In FIG. 1, a magnetic pick-up unit 21 operatively scans a document 30 having magnetic ink or the like thereon and generates an electrical analog output signal indicative of the data read from the document 30. The magnetic pick up 21 supplies the analog output signal to the amplifier circuitry of block 22, and the output of the amplifier of block 22 supplies the amplified analog electrical output signal to the input of an analog-to-digital (A/D) converter 23. The digital output of the analog-to-digital converter 23 is supplied to the data input of a random access memory or RAM 24. Both the analog-to-digital converter 23 and the random access memory (RAM) 24 are operatively coupled for communication with a control processor 25. Furthermore, the RAM 24 communicates with a video display system 26 under control of the processor 25. Lastly, the RAM 24 supplies data to a data and transform RAM 27 which then supplies the necessary data to the Fourier Transform pattern processor 28 and the calibration character RAM 29.

The system of FIG. 1 is essentially a pattern or character recognition system for MICR or magnetic ink character indicia on a document, for fingerprints, and/or for OCR or optical character recognition systems and the like. Specifically, in the preferred embodiment of the present invention, the system is used to convert scanned MICR data and to produce digitized MICR data which is used for the correct identification of a scanned unknown character. The character data is Fourier Transformed and the transformed data is then compared with a set of standard or reference data to determine the "best match" which is then identified as the character which was scanned. The input data is stored in the memory and is then converted to real and imaginary frequency components through the Fourier Transform, and these components or elements are converted to amplitude and phase values as a function of frequency. Both amplitude and phase data are then compared to a set of amplitude and phase data for the set of standard characters. The standard character amplitude and phase which is closest to the value of the unknown character is then specified as the particular character which was scanned or read.

The system of FIG. 1 provides a systemized approach to analyzing, recognizing and categorizing weighed forms, patterns fingerprints, or signatures through the use of a Fourier Transform operation on sensed or scanned signals generated by scanning the weighted form, pattern or signature by means of magnetic, optical, video, audio, capacitive, or any other type of conventional sensor. The applications and utilities of equipment or systems embodying such signal processing means include but are not limited to, the evaluation of Magnetic Ink Character Recognition (MICR) encoded documents; Optical Character Recognition (OCR) encoded documents; currency counterfeit detection through evaluation of magnetic ink printed patterns; voice and video-coded patterns containing forms of recognizable signatures; fingerprint analysis; pressure pattern forms of recognizable signatures; written signature analysis; BAR code-encoded documents; foreign language and security inscription analysis; encoded digital video or analog communication pattern analysis; and any other application where distinctive characteristics of waveforms, patterns, signatures or other indicia can be organized into a frequency spectrum and formatted into a signal susceptible to analysis by its Fourier Transform, and wherein this pattern compared to a similar one derived from a previously analyzed standard or reference for recognition purposes.

The usual method of accomplishing this is through the use of a weighted specification reference system or the like. If a straight weighted specification reference system is used, it generally has a low confidence of accurate recognition due to noise and variations in amplitude between identical characters from different documents due to slight printing variations and the like. The system of FIG. 1 avoids these problems by providing a recognition technique and a defect analysis technique which are accomplished in a system which is (1) very insensitive to noise over the frequencies actually contained in the character to be recognized; (2) very insensitive to variations in signal amplitude; and (3) very insensitive to variations in character position within the data to be read or analyzed.

Briefly, the system of FIG. 1 operates such that the paper of other medium or material containing the pattern, indicia or character to be read and recognized is moved past the sensor, magnetic or otherwise, which produces an analog electrical signal proportional to the magnetic ink deposited on the paper. This signal is run through an operational amplifier 22 after it is read from the magnetic pick up 21 and then fed to the input of an analog-to-digital converter 23. The digitized samples are then stored in a digital memory 24 where they are available for further processing, as required. The scanning rate and the digitizing rate are controlled by a central processor 25. Since the rate of the movement of the paper and the rate of digitizing are controlled by a common control processor 25, the resulting data is the magnetic intensity as a function of distance. This scanned data is then sent to a temporary memory, usually referred to as the Data Transform Memory 27. At this point, a special processor 28, called the Fourier Transform and Pattern Processor, analyzes the digital data. The recognition process that is applied to the data is illustrated in the flow diagram of FIGs. 8A-8C, as hereinafter described.

FIG. 2 shows a block diagram illustrating the circuit board implementation of the block diagram of FIG. 1. In FIG. 2, the overall functional block diagram of FIG. 1 is shown as being divided into three separate circuit board implementations including the Video Circuit Board 31, the MPU Circuit Board 32, and the ROM/IO Circuit Board 33.

The video circuit board 31 shows block 35 as illustrating the video circuitry. Clock and control signals, which are supplied from input 39 and node 41, are then supplied to an input of the video circuit of block 35 via lead 42. Similarly, the amplified electrical analog signal from the output of the magnetic read apparatus 64 is supplied via lead 43 to another input of the video circuitry of block 35. An output of the video circuit 35 is connected via lead 38 to the input of a CRT control circuit 36 whose output is connected via lead 49 to the input of the CRT display illustrated by block 37.

Further, connection 45 couples the video circuitry of block 35 to the front panel circuitry of block 51 to supply calibration information therebetween. Another output of the video circuitry 35 is connected via lead 48 to supply the CRT address to the MPU of block 32, while the MPU 32 supplies latched video information to the video circuitry of block 35 via lead 46. The MPU data from MPU 32 is supplied via lead 55 to node 54 and from node 54 to another I/O port of the video circuitry of block 35 via lead 47 and to an I/O port of the ROM/IO circuitry of block 34 of the ROM/IO board 33, as hereinafter described. The clock and control signals from input lead 39 are supplied to node and thence via lead 40 to a node 301. Node 301 is connected to an IO port of the MPU 32 via lead 302 and to an I/O port of the ROM/IO 34 via lead 303. Lastly, the MPU 32 is bidirectionally connected or coupled for MPU addressing via address bus 57 which is connected to a corresponding I/O port of the ROM/IO circuitry of block 34.

The output of the front panel circuitry of block 51 is supplied via lead 52 to another input of the ROM/IO circuitry of block 34 which, as previously noted, receives the clock and control signals from node 301 via lead 303, the MPU data bus information via lead or bus 56, and the MPU address bus information via address bus 57. The ROM/IO circuit board 33 also includes a scanner circuit 65, a magnetic read head circuit 64, a scanner control circuit 66, a solenoid drive circuit 68 and a motor drive circuit 67, as well as the ROM/IO circuit of block 34. The scanner control unit 66 supplies information to the scanner of block 65 including motor control information on lead 72, solenoid control information on lead 73, and sensor information is supplied back and forth on lead 74.

The solenoid drive of block 68 has its output connected to the scanner control circuitry of block 66 via lead 69 while the motor drive circuitry of block 67 has its output connected to another input of the scanner control circuitry of block 66 via lead 71. Lastly, the sequential scan data is bidirectionally transferred between the scanner control circuit of block 66 and the ROM/IO circuitry of block 34 via lead or bus 59. One output of ROM/IO 34 is taken from lead 61 and supplies the printer and keyboard peripheral ports while another output supplies the debug port information on output lead 62.

The circuitry on the video circuit board of FIG. 2 comprising the functional blocks including the video of block 31, the MPU of block 32 and the ROM/IO of block 33 perform the standard functions as indicated previously.

FIG. 3 illustrates the circuitry contained on the video circuit board 31 of FIG. 2. In FIG. 3, the latched video data from the MPU 32 of FIG. 2 is supplied via lead or data bus 46 to the input of a buffer 76 whose output is supplied via lead 78 to the input of a CRT display control unit 77. The output of the CRT display control unit 77 is supplied via lead 81 to one input of a Video INTF circuit 79 whose output is taken from lead 82 to supply the VIDEO SYNC signals for use as hereinafter described. A first chip select signal CSI is supplied from input 89 lead to input node 86. Node 86 supplies the first chip select signal CSI to the input of the latch offset register 83 via lead 87 and the other input of receives the MPU data bus information from data bus 47 of FIG. 2. The MPU data bus 47 is also connected to the input of a second buffer 84. The output of buffer 84 is connected via lead 96 to node 95.

Node 95 is connected via lead 94 to the "D" input of the CRT timing control circuitry of block 92; to the input of the math processor 117 of block 116 via lead 97; and to the output of the analog-to-digital converter circuit of block 99. The output of the latch offset register 83 is connected via lead 105 to the "B" input of a multiplexor 106, and the "A" input of miltiplexor 106 is supplied via lead 100 from the "A" output of the CRT timing control circuit of block 92. A second chip select signal CS2 is supplied via input lead 91 directly to one input of the control logic circuitry of block 118 of the circuit of block 116, and the math processor 117 is bidirectionally connected to the control logic circuitry of block 118 via bus 124. The output of the control logic of block 118 is supplied elsewhere via output lead 125.

Timing signals and clock signals are supplied from the clock 110 whose rate is determined by the value of the crystal oscillator 115. One clock output supplies the signal RTC on clock output lead 114 while the other output supplies the clock signal CL on lead 112 to output node 111. Node 111 supplies the CL clock signal to the output lead 113 and is also connected via lead 109 to a node 108. Node 108 is connected via lead 104 to the clock input of the analog-to-digital (A/D) converter 99, and simultaneous, via lead 119 to a node 121. Node 121 is connected via lead 122 to one input of the math processor of block 117 and through a lead 123 to the control logic circuit of block 118. The multiplexor 106 has its output connected to supply the output signals indicative of the CRT addresses on lead 107. Lastly, an operational amplifier 98 has one input connected to receive the analog scanner signals on lead 101 and another input connected to receive the gain control signals on lead 102. The output of the operational amplifier 98 is supplied via lead 90 to the input of the analog-to-digital converter 99.

FIG. 4 illustrates the MPU circuit board 32 of FIG. 2. In FIG. 4, the CRT address bus supplies address data on bus 107 to one input of the multiplexor circuit 126. The other input to the multiplexor circuit 126 is taken from node 143 via lead 255, and the output of the multiplexor 126 is connected via lead 251 to the input buffer 127 of RAM circuit 128. An output of the RAM 128 is connected to the anode of an LED or light-emitting diode 129 whose cathode is connected back to the RAM 128 via lead 253. The LED 129 is used to supply parity information.

The MPU 130 has its AD output connected via lead 256 to node 143, and node 143 is connected via lead 257 to the input of a buffer 132; through a lead 255 which supplies the MPU local address information to the second input of the multiplexor 126, as previously described; and via lead 125 to a node 144. The output of the buffer 132 is connected via lead 258 to node 146, and node 146 supplies the MPU address bus signals on bus 259 and supplies the input bus 261 to the address decoder circuitry of block 136. The output of block 136 supplies the peripheral chip select control signals on lead 260, for use as hereinafter described.

A node 264 is connected via lead 265 to the DA port of MPU 130; via lead 272 to the DA port of the DMA 131; and to node 267 via lead 266. Lead 267 is connected via lead 268 to the input of a buffer 134 for supplying the MPU local data thereto and buffer 134 is connected via bus 75 to a node 145 for supplying RAM Data Bus information thereto. Node 145 connects the RAM data bus information to one input port of RAM 128 via bus 85 and via bus 305 to the input of a P.E. latch 135 whose output supplies the latched video data bus information on output data bus 75. Node 267 also supplies the MPU local data bus signals via bus 269 to the input of a buffer stage 137 whose output supplies the MPU data bus information to the remaining circuitry via data bus 302. The DMA 131 has its AD port connected via lead 273 to node 144, which in turn is connected via lead 274 to the output of a pullup circuit 133 whose input is connected to a plus five volt (+5 V) source of potential via lead 275. Lastly, a buffer circuit 138 has its input connected via lead 139 for receiving the clock and control signals, and for outputting buffered clock and control signals on outputs 141.

Figure 5:
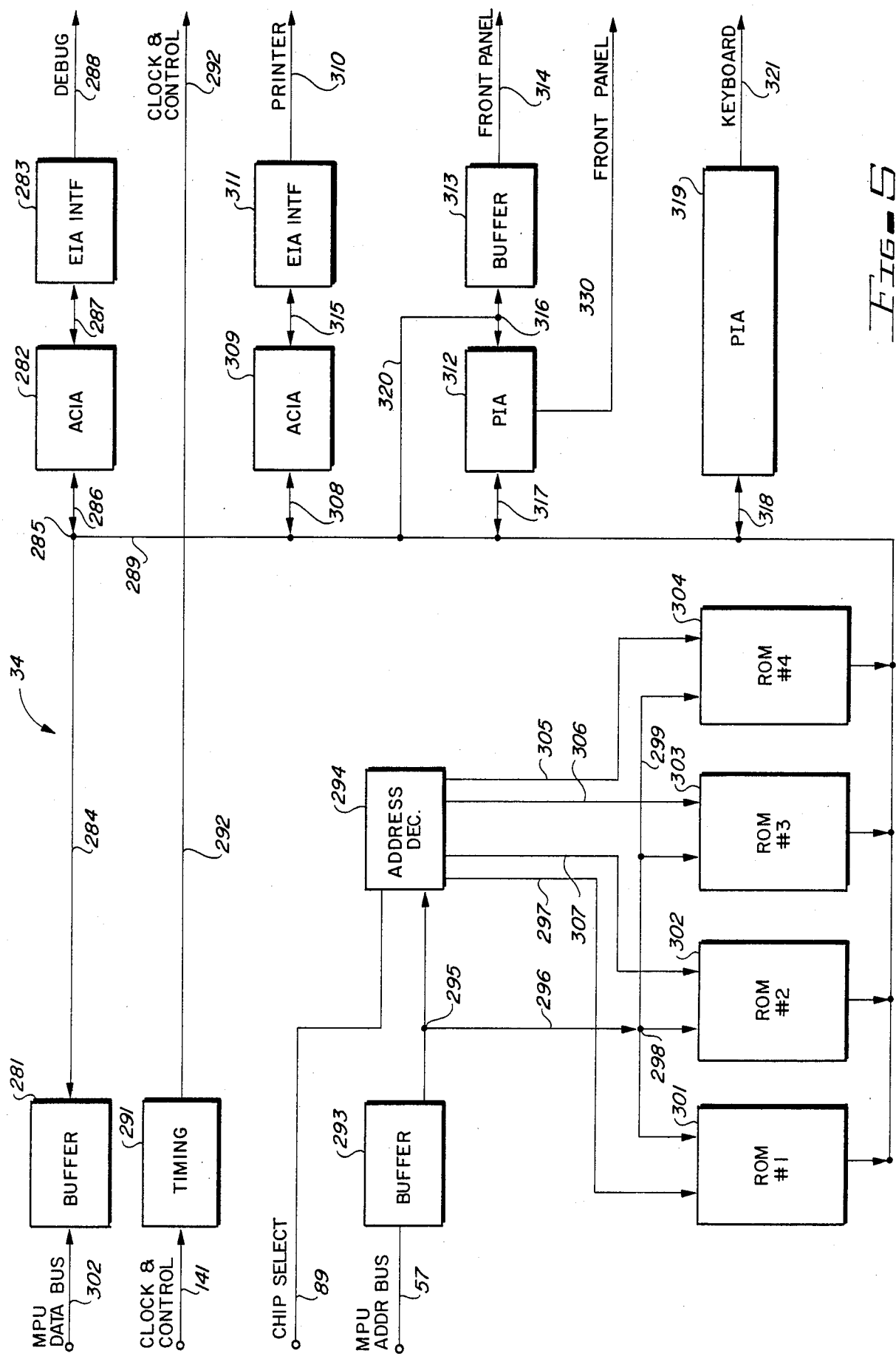
FIG. 5 is a functional block diagram of the ROM/IO circuit board of the block diagram of FIG. 2.

Lastly, FIG. 5 illustrates the ROM/IO circuit board of FIG. 2. FIG. 5 shows the MPU data bus input 302 supplied to the input of a buffer circuit 281, and the output of the buffer circuit 281 is connected via lead 284 to node 285. Node 285 is connected via lead 286 to the input of ACIA circuit 282, and the output of the ACIA circuit 282 is connected to the input of the EIA INTF circuit 283 whose output supplies the de-bug information signals on output bus 288.

The clock and control input 141 supplies these signals to the input of a timing and control circuit represented by reference numeral 291, and the output of this circuit is connected via lead 292 to output the clock and control signals for use as hereinafter required.

A chip select signal is supplied via lead 89 to one input of an address decoder 294 while the other input of the address decoder 294 is taken from node 295 at the output of a buffer 293 whose input receives the MPU address bus data on bus 57. The output of the address decoder 294 is connected via lead or bus 305 to an input of a Read Only Memory or ROM #4 which is designated by reference numeral 304; via lead or bus 306 to an input of a ROM #3 which is designated by reference numeral 303; via lead 307 into the input of a ROM #2 which is designated by reference numeral 302; and via lead 297 which is connected to the input of a ROM #1 which is designated by reference numeral 301. Simultaneously, a second input to each of the ROMs 301, 302, 303, and 304 is connected via node 298 and lead 299 and via lead 296 which connects node 298 to the output node 295 at the output of the buffer 293. Simultaneously, the outputs of each of the ROMs 301, 302, 303, and 304 are commonly coupled together on bus 289 to supply information to node 285, as previously described.

Furthermore, node 285 is connected to the input of ACIA 309 via bus port 308, to the input of a first PIA 312 through bus port 317, and to the input of a second PIA 319 through a bus 318. The output of the ACIA 309 is connected via lead 315 to the input of an EIA INTF 311 whose output supplies printer information on output lead 310. Similarly, the output of PIA 312 is connected via lead 316 to the input of a buffer 313, and the output of the buffer 313 supplies front panel information on output lead 314. Node 285 also supplies MPU data and the ROM output data via leads 289 and 320 to node 316. Node 316 is connected directly to the output of PIA 312 and to the input of buffer 313. Front Panel Data is then carried over lead or bus 330 to another I/O port of the PIA 312. Lastly, PIA 319 supplies keyboard information on output lead 321.

Figure 6:
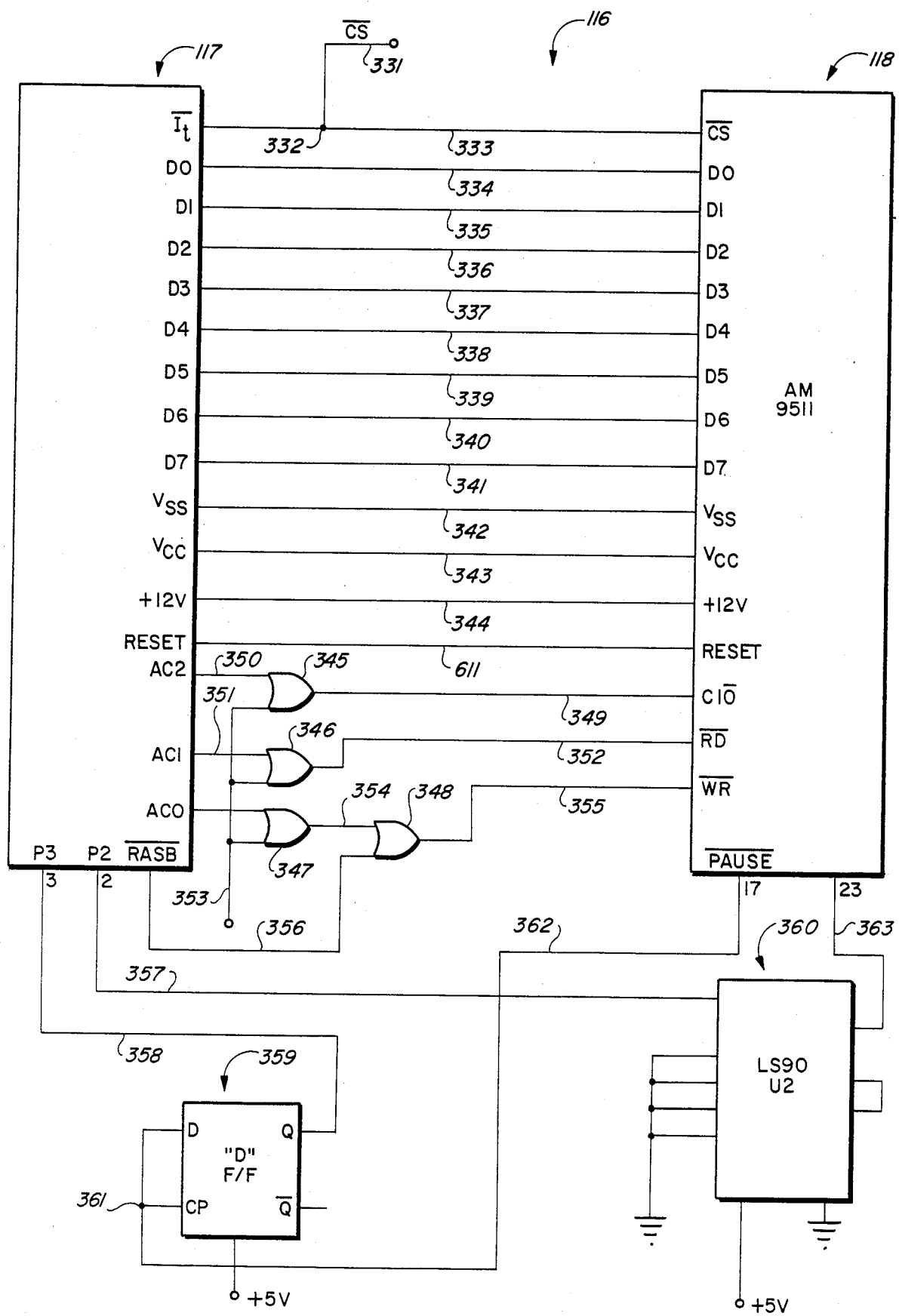
FIG. 6 is a functional block diagram of a modified math processor and associated gating logic found on the video board circuit of FIG. 3.

Next, the specialized or customized circuitry contained on the video circuit board 31 of FIG. 3 will be described with reference to FIG. 6. In FIG. 6, the two main components are referred to as the mathematical processor 118 and the associated daughter board attachment of block 117. The I/O ports are designated as I, D, D1, D3, D4, D5, D6, and D7 of the circuit board 117 are connected to the corresponding IO ports CS, DO, D1, D2, D3, D4, D5, D6, and D7, respectively, of the processor 118 via leads 333, 334, 335, 336, 337, 338, 339, 340, and 341, respectively. Actually, the I/O port I of block 117 is connected directly to node 332 which is connected via lead 331 to a source of the chip select signal CS. Node 332 is then connected via lead 333 to the CS input of the math processor 118. Furthermore, the IO ports V, V, and +12 V of block 117 are connected via leads 242, 243, and 244 to the corresponding I/O ports V, V and +12 V, respectively, of the processor 118. Yet further, the RESET input of block 117 is connected via lead 611 to the RESET of the input processor 118.

Still further, the AC2 output of block 117 is connected via lead 350 to one input of a first two input logical OR gate 345 whose output is connected via lead 349 to the CLO input of the processor 118. Similarly, the I/O port AC 1 of block 117 is connected via lead 351 to the first input of a second two input logical OR gate 346 whose output is supplied via lead 352 to the RD input of the math processor 118. Still further, the first input of a third logical OR gate 347 is connected directly to the ACO output of block 117 while the output or OR gate 347 is connected via lead 354 to the first input of a fourth two input logical OR gate 348 whose output is directly connected via lead 355 to the WR input of the processor 118. Further, an input signal is connected via lead 353 to the second input of each of the two input logical OR gates 345, 346, and 347 while the output RASB is supplied via lead 356 to the second input of the fourth logical two input OR gate 348, as previously described.

The number two pin (P2) output of the board 117 is connected via lead 357 to a first input of the circuit of block 360 while the pin number 3 (P3) output is supplied view lead 358 to the non-inverting "Q" output of a "D"-type flip flop 359. The flip flop 359 has its "D" input commonly coupled to the "CP" input at node 361 which is connected via lead 362 back to the PAUSE output of the processor 118. The block 360 has its output connected via lead 363 to the P23 I/O port of the math processor 118 to complete the circuit connections of the custom portion of the video circuit board of FIG. 2.

An overall description of the system of FIG. 1 will now be set forth with respect to FIGS. 2-6, respectively. The system of the present invention is used to evaluate various print characteristics of MICR characters printed with magnetic ink in the format specified by the American Banker's Association, the Canadian Banker's Association, or the European Computer Manufacturer's Association. The instrument will accept all checks and financial documents complying with the format specified by these organizations. The documents can be inserted into the system and read or scanned without adjustments. Typical specifications for the documents to be tested, the character size and format, the print variations permitted, and the various weighs which result from scanning MICR characters can be found in ANSI standard X3.2-1970.

A MICR document to be measured or read is first inserted into the system and the document is rotated past a magnet and then a magnetic read head. The magnetic voltage generated in the magnetic head is then amplified, digitized and stored in memory. This data is then withdrawn from memory per programmed instructions and displayed on a CRT monitor display in the form of positive and negative peaks of a continuous waveform. Various waveform characteristics can then be used in the transformed state to uniquely identify each character. The operation of the system of FIG. 2 will be better understood with reference to the flow diagrams hereinafter described which set forth the program or operation of the system to accomplish the desired function and result sought to be achieved in the system or the present invention.

Figure 7:
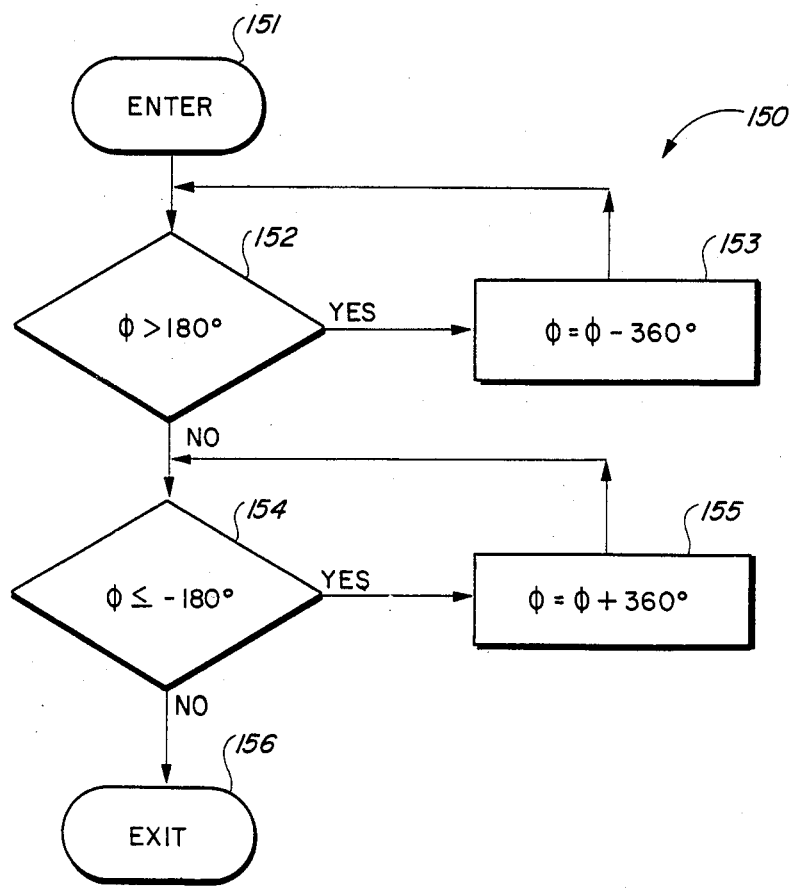
FIG. 7 is a flow diagram of a sub-routine for correcting the phase angles to a ±180° range.
Figure 8A:
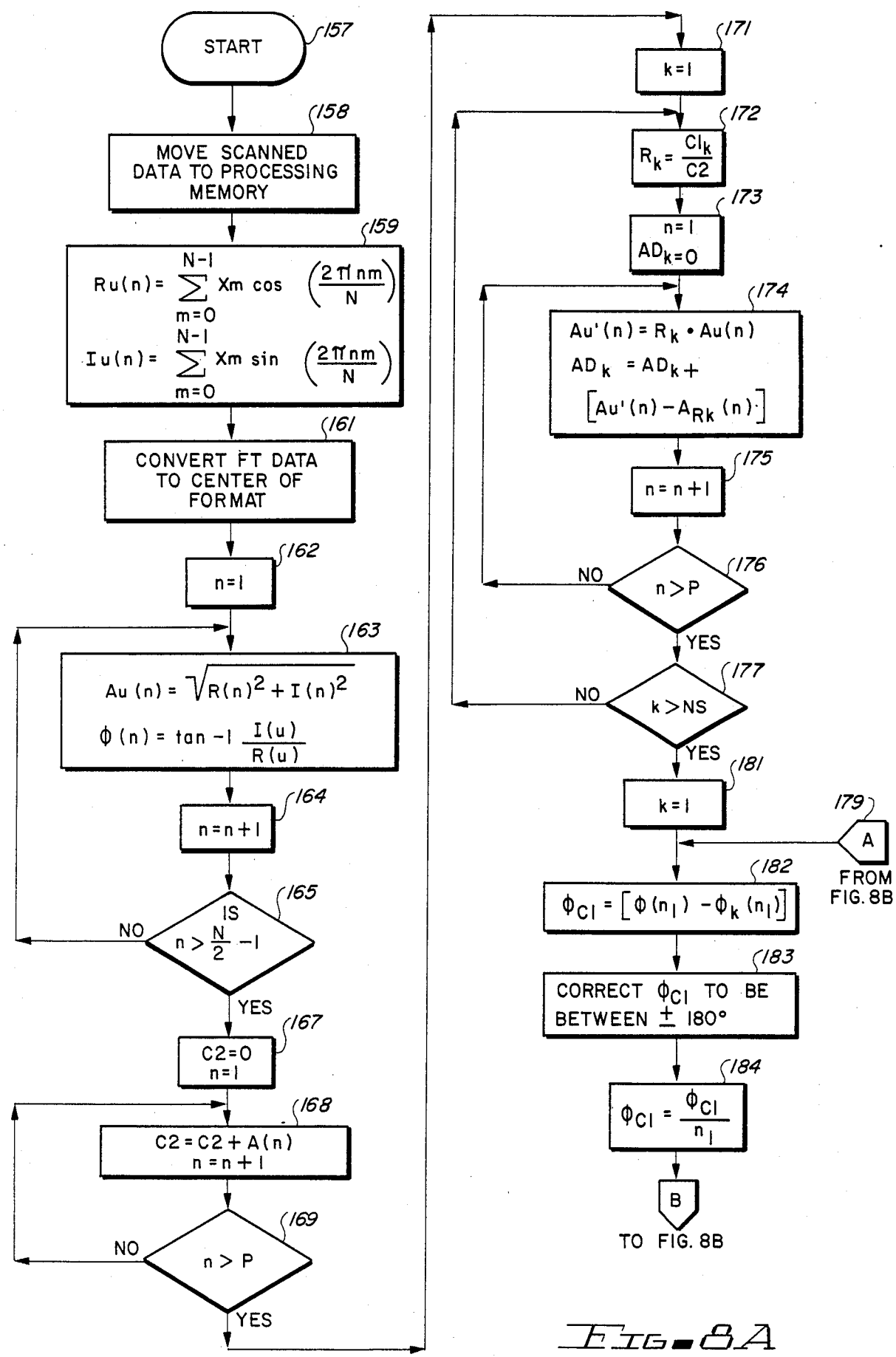
FIG. 8A is a flow chart of a first portion of the pattern matching algorithm of the present invention.
Figure 8B:
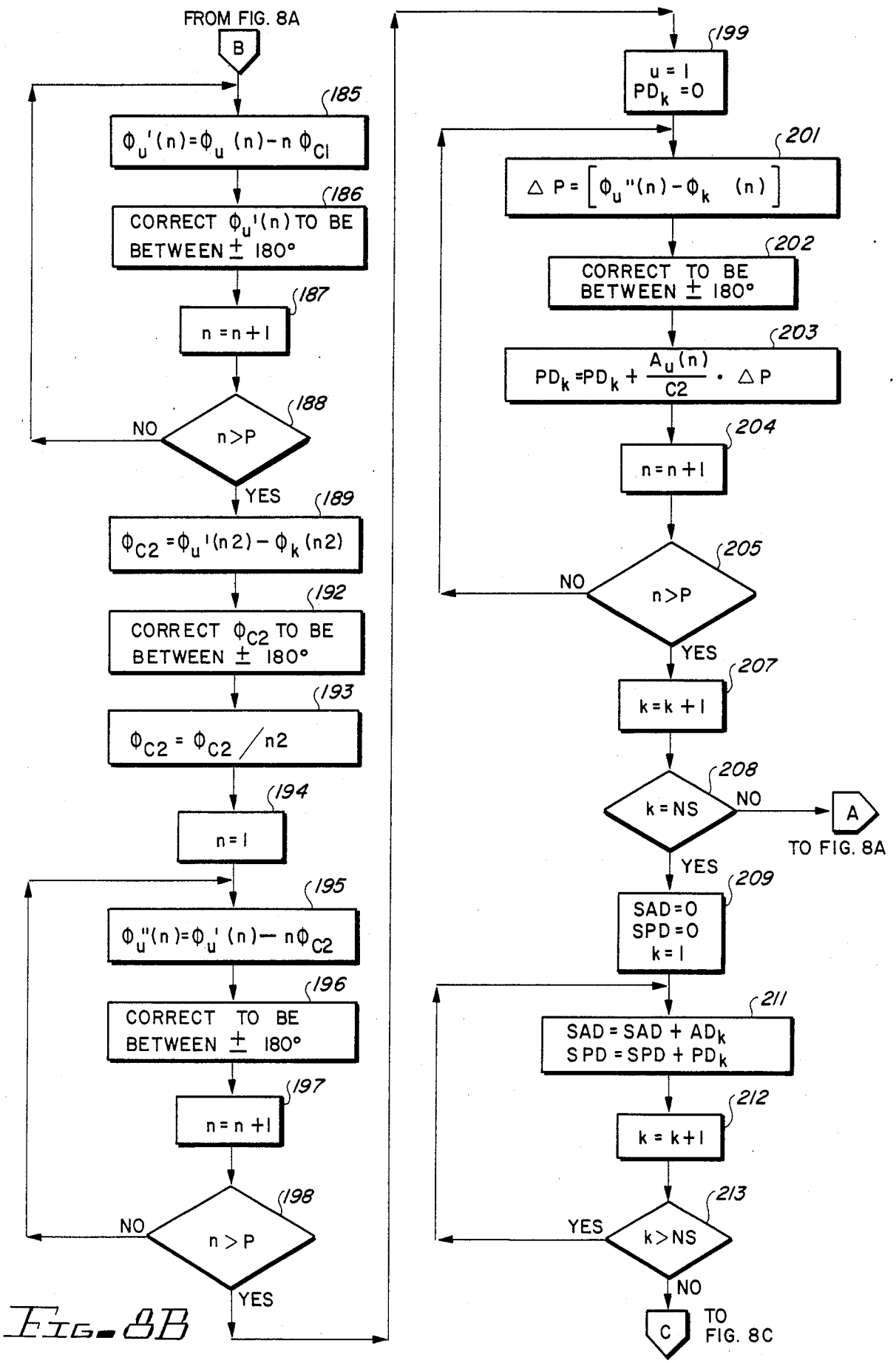
FIG. 8B is a second portion of the pattern recognition algorithm of the present invention.
Figure 8C:
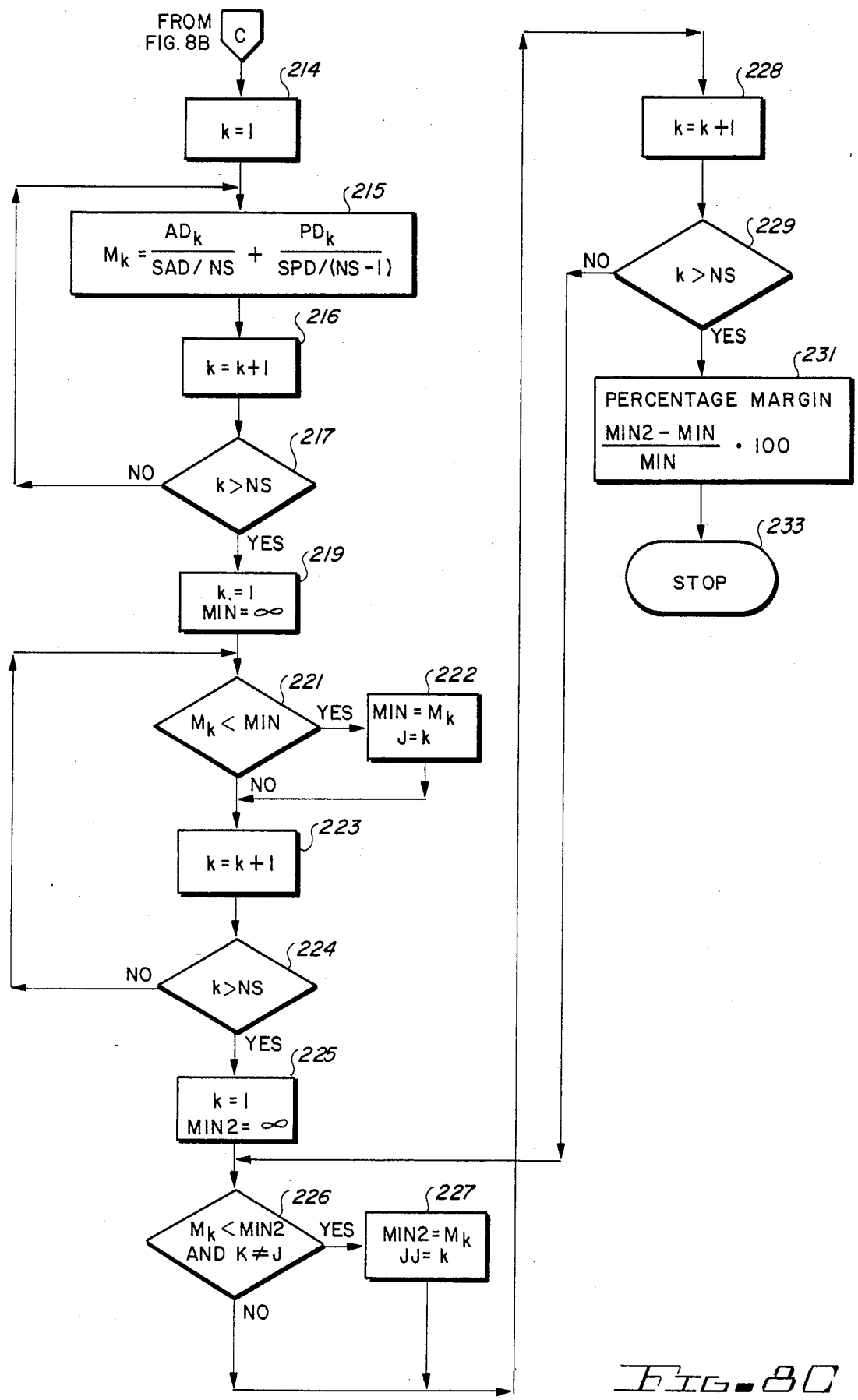
FIG. 8C is the third and final portion of the flow diagram of the pattern recognition algorithm of the present invention.

FIGS. 7, 8A, 8B, and 8C illustrate the flow diagram or flow chart of the pattern match algorithm and related sub-routines of the system of the present invention. In FIG. 8A, a start block 157 initiates the system and block 158 indicates that the scanned data, after it has been converted to an analog electrical signal and amplified, is converted to a digital value and stored in a temporary memory, usually referred to as a Data Transform Memory. At this point, the special mathematical processor 118 of FIG. 6 analyzes the digitized data. The recognition process that is applied to the data can be generally described with reference to the flow diagram under discussion. Block 159 indicates that the Fourier Transform of the scanned data is computed by the Fourier Transform algorithm and both the real and imaginary parts are computed. The value X is the mth sample that was digitized and R (u) is the real part of its Fourier Transform while I (u) is the imaginary part of its Fourier Transform. The value "N" is the total number of samples in the test. From block 159, we proceed to block 161 where the operation of converting the Fourier Transformed data to the center of the format is undertaken. Since the data returned from the step of block 159 has the zero distance reference at the first point, the zero reference is shifted to the appropriate center of the format by multiplying the real and imaginary parts of the odd points by negative one ($-1$). This step is known in process block 161.

The value "n" is then set equal to one ($n=1$) in process block 162, and the real and imaginary parts of the returned transform are converted to amplitude and phase form by the equations of block 163. The value of "n" is then increased by one such that $n=n+1$ and block 164 and the next step questions whether or not "n" is greater than N/2 minus one [$n>(N/2-1)$]. If this is true, we proceed to FIG. 9, and if this is false, we return and convert the next real and imaginary parts by the equations of process block 163 again. The operation specified in the previous steps are performed once for each of the reference or calibration characters and they are stored in the permanent memory, called the Calibration Character ROM. An amplitude normalization valued is also computed for each of the reference characters stored in the calibration character ROM as hereinafter described. FIG. 8A continues to block 167 wherein the value of C2 is set to zero ($C2=0$); and "n" is set equal to one ($n=1$). The process then proceeds to block 168 wherein C2 is set equal to $C2+A(n)$ and "n" is set equal to "$n+1$". The process then proceeds tot he interrogatory process block 169 where the question asks whether or not $n>p$, where "p" is the number of Fourier Transform points used in the matching algorithm and "p" is always less than or equal to N/2, i.e. ($p\leq N/2$). If false, the program returns to the output of block 167; but if true, it proceeds to block 171 which sets $k=1$ and thence to block 172 which computes the normalization constant $R_k=C1_k/C2$. Next, block 173 sets $n=1$ and the sum of the absolute amplitude differences $AD_k=0$ before proceeding to block 174 where the normalization operation begins.

If "p" is thenumber of frequency points used, $A_{Rk}(n)$ is the amplitude of the kth reference character at the nth frequency point and $C1_k$ is the amplitude normalization constant for the kth reference character, then the value of $C1_k$ is given by Equation #1 in the Table of FIG. 9. The operation specified herein are only done once for the reference characters but must be done each time for an unknown character. Comparing an unknown character to each of the reference characters, an amplitude or normalization constant is computed for each of the reference characters, by Equation #2 and $R_k=C1_k/C2$. This value of $R_k$, where k designates the kth reference character, is essentially the ratio of the amplitude of the reference character to the amplitude of the unknown character. Normalization of the amplitude values of the unknown character by the normalization constant are accomplished by the equations of block 174 for all of the "n" points used.

This normalization operation eliminates absolute differences in amplitude between the unknown character and the reference characters in the matching algorithm. Once a character match is found, the value $R_k$ can also be used as a quality control number to indicate how close the amplitude of the scanned character is to the standard. The sum of the absolute amplitude differences between the unknown character and each of the reference characters is finally computed by the steps of block 174, before proceeding to blocks 175, 176 and 177. When the processing indicated by these blocks is completed, a set of "k" values of AD exists, where AD is the sum of the transform differences between the kth reference character and the unknown character. It cannot be assumed that the reference character and the unknown character are exactly aligned with respect to the start of the record. Since the recognition algorithm uses both amplitude and phase differences, a method of aligning the two characters must be used. Amplitude is not sensitive to position differences, but phase is sensitive to position error and hence compensation is required. If the two functions are the same, but displaced in time, they can be corrected by subtracting a linear phase shift term from the phase function of the unknown character by Equation #3.

To do this, an estimate of tau ($\tau$), the time or position difference, is obtained by Equation #4 where f1 is a specific frequency chosen for phase matching. All of the phase angles of the unknown signals are then adjusted by the Equation #5 where $\tau$ is found as above and $\phi_u(f)$ indicates the adjusted phase angles as a function of frequency.

The phase functions $\phi(f)$ is a circular function, i.e. $0(f)=\phi(f)+m\cdot 360°$, where "m" is any integer. Therefore, the initial frequency $f_1$ for phase correction should be a relatively low frequency. However, after this initial correction, a more accurate phase correction would be obtained if a higher frequency is used for a second phase correction. The same corrections are used, but the frequency $f_1$ is selected to be larger. Since the Fourier Transforms are computed in digital form, the correction equations become as set forth in FIGS. 8A and 8B where $n_1$ is the transform point chosen to estimate the first phase correction, and n2 is the transform point chosen to estimate the second phase correction ($n_2>n_1$). The phase correction is equivalent to moving or sliding the unknown character relative to the reference character before computing the Fourier Transform of both characters. After each phase correction, the resulting phase angles are adjusted to range between $-180°$ and $+180°$ by the equations set forth in FIG. 7.

Since the correct quadrant must be observed for the phase angles, the algorithm or flow chart of FIG. 7 must be used. The diagram is entered at block 151 and proceeds to block 152 where we are asked whether or not the phase angle is greater than 180°. If this is true, the phase angle is set equal to the phase angle less 360° at block 153 and returned to the output of the entry step 151. If, however, this is false, the output proceeds to block 154 which asks whether or not the phase angle is less than or equal to −180°. If this is true, we proceed to block 155 and set the phase angle equal to the phase angle plus 360° and then return to the output of block 152. If false, we proceed directly to the exit step of block 156.

In effect, this corrects the quadrant or the phase angle such that if both the real and imaginary parts are positive, the angle lies in the first quadrant; if the imaginary part is positive and the real part negative; the angle is in the second quadrant, if both the real and imaginary parts are negative, the angle lies in the third quadrant, and if the real part is positive and the imaginary part negative, the angle lies in the fourth quadrant. Therefore, FIG. 7 will serve to adjust the phase angles to range from −180° to +180°.

FIG. 8B interconnects to the flow diagram of FIG. 8A at block 181 which sets k=1. From there, block 182 computes the phase value $\phi_{cl}$ the first phase correction value and then proceeds to block 183 which corrects $\phi_{cl}$ to be between ±180° by the method described in FIG. 7. Block 183 is connected to block 184 where $\phi_{cl}=\phi_{cl}/n_1$ and "n" is set=1. From here, we proceed to block 185 wherein the values $\phi_u(n)$ are computed for all "n" up to the number used in the algorithm, "p". Again, the value is corrected by block 186 to be between +180° and "n" is set equal to n+1 in block 187. The diagram then asks whether "n" is greater than "p" in block in 188. If not, the program returns and corrects the phase of the next point and if true, the first phase correction is completed. It then proceeds to compute the value of $\phi_{c2}$ via block 189. This valve $\phi C2$ is the next phase correction valve to be used.

In FIG. 8B, $\phi_2$ is corrected to be between ±180° by block 192, and block 193 then computes the value of the second phase correction value. "n" is then set equal to one (n=1) in block 194 and the value of $0_u''(n)$ is computed to obtain the second set of phase correction angle and this value is corrected to be between ±180° by the process of block 196. "n" is then set to "n+1" by block 197, and the interrogatory of block 198 asks whether n>P. If no, the program returns to the output of block 194. If, however, the answer is yes, the second set of phase corrections is completed, and the program proceeds to block 199 which sets n=1 and $PD_k=0$. From there, block 201 computes the absolute phase differences between the sample and the kth reference character block 202 corrects the value to be between ±180°. Block 203 then computes the sum of the weighted phase difference between the sample character and the kth reference character with the phase differences weighted by the amplitude of the unknown character at each frequency point by Equation #6 where $A_u(n)/C2$ is the amplitude weighting factor and Equation #7 is the difference. P must be adjusted to range from ±180°. The term $A_u(n)/C2$ is the fraction of the amplitude of C2 at the nth frequency due ot Equation #2. The weighting of the phase differences by the amplitude at each frequency point is important in obtaining an accurate measure of the phase differences because the higher the amplitude at a given frequency point, the closer the phase angles should match if the unknown character is identical to a reference character. The process then proceeds to block 204 where "n" is set equal to "n+1" (n=n+1) and then to the interrogatory block 205 where the question is asked as to whether or not n>P. If false, the program is re-entered at the output of block 199 to sum the next phase point.

Then, "k" is set equal to "k+1" (k=k+1) in block 207 and the question is asked whether or not k>NS in block 208 where NS is the number of reference characters. If false, the program is exited and re-enters the flow diagram of FIG. 8A at the output of block 181. If true, the program proceeds to block 209 wherein SAD−0; SPD=0; and k=1. From there, blocks 211, 212, and 213 compute the average amplitude and phase difference across all of the reference characters. If k>NS, we return to the output of block 209, but if k<NS, we set k=1 in block 214 and proceed to block 215. In blocks 215, 216 and 217, the program computes the combined amplitude and phase match values for each of the reference characters. This essentially weights the amplitude and phase differences equally, and by the amount they are less than the average differences. A perfect match in both amplitude and phase would produce a value of $M_k=0$. Blocks 219, 221, 222 and 223 determine the value of k for which M is minimum. The value of "k" for which "$M_k$" is a minimum is found and this is defined as the reference character which is the "best match" for the unknown character. Blocks 225, 226, 227, 228 and 229 determine the second minimum value or the second best match.

The second minimum value is used to find the percentage by which the "best match" is better than the second "best match" for the unknown character. This number is a margin of error and is computed by block 231. At this point the program proceeds to block 233 and comes to a stop.

Therefore, in the latter stages of the program, the absolute phase differences computed between the unknown character with the phase differences are weighted by the amplitude of the unknown character at each frequency point. The weighting of the phase differences by the amplitude of each frequency point is important in obtaining an accurate measure of the phase differences because the higher the amplitude of the given frequency point, the closer the phase angle should match if the unknown character is identical to a reference character. The equations described in the program are performed once for each reference character. At the end of these operations, a set of values are available, one value for each reference character. The sum of the amplitude and phase differences over all of the reference characters is obtained and a combined amplitude and phase match value is determined for each of the reference characters. This essentially weights the amplitude and phase differences equally and by the amount they are less than the average difference. A perfect match in amplitude and phase result in the value of $M_k=0$. The value of k for which M is a minimum is found. This is the reference character which is the "best match" for the unknown character.

The second minimum value is found and used to find a percentage that the best match is better than the second best match. This number is essentially a "margin of error" criteria. This percentage difference may be computed by the present algorithm. This percentage margin value is very useful since it provides a confidence value that a correct match of the unknown character to the reference character has been found. A low value, for example under 10%, would indicate that the match may be in error.

The system of the present invention and its method of operation utilizes the Fourier Transform of a scanned character to perform the recognition of the character out of the set of possible characters. In the method and apparatus of the present invention, a method is provided for eliminating the absolute amplitude difference from the recognition process while simultaneously providing a method of correcting for position difference between the reference characters and the unknown character. The present invention provides a method of weighting the phase differences proportional to the expected accuracy of the phase data which minimizes the effects of noise on the measurement. It further provides a method of combining amplitude and phase data to define a single "best match" criteria for an unknown character.

In the block diagram of FIG. 3 representing the video circuit board 31 of FIG. 2, the buffer unit 76 is preferably an 74LS244 tri-state octal buffer such as that manufactured by Signetics Corporation. The buffer 84 is preferably an AM2947 3-state octal bus transceiver such as that made by Advanced Micro Devices, and the CRT display control circuit of block 77 is, in the preferred embodiment of the present invention, a conventional CRT 8002 such as that manufactured by Standard Micro-Systems Corp. The CRT 8002 is a CRT video display attributes controller and video generator which includes the circuitry required to the display portion of the video terminal. The output of the CRT display control circuitry of block 77 is supplied to the Video INTF circuitry of block 79 which is implemented by a 74S04 Hex inverter and a 74S38 Quad 2-input open-collector NAND Gate such as made by signetics.

The mathematical processor of block 117 is preferably a Am9511A arithmatic processor such as that manufactured by Advanced Micro Devices or a conventional Intel 8231A. The control logic of block 118 is again implemented with conventional logic gates and the like.

The latch offset register of block 83 is preferably on LS 374 8-bit, positive edge-triggered register such as that manufactured by Signetics Corp. The device is referred to as an Octal D-type flip-flop with tri-state outputs. As previously mentioned, the buffer of block 84 is identicla to that of block 76, previously described, and the CRT timing control circuitry of block 92 is preferably a CRT 5027 CRT Video Timer and Controller such as that manufactured by Standard Micro Systems Corp. The VTAC block 92 contains the logic functions required to generate all of the timing signals for the presentation and formatting of interlaced and non-interlaced video data or CRT monitor. The buffer 84 of the present system utilizes an octal, tri-state, bi-directional bus transceiver such as a conventional AM2947 device manufactured by Advanced Micro Devices. Block 98 includes an LM308 Op. Amp. such as made by Motorola, Inc.

Similarly, a high performance 10-bit bus interface register, such as an AM29821 device manufactured by Advanced Micro Devices. The analog-to-digital converter of block 99 is preferably a ADC0820 device which is referred to generally as an eight-bit high speed, micro processor compatible A/D converter with track and hold functions such as that manufactured by National Semiconductor Corp. The adder circuitry of block 106 includes conventional associated logic units such as an LS157 two-input data selector/multiplexor such as that manufactured by Signetics Corp.; an LS163 four-bit binary counter such as that manufactured by Signetics Corp.; a fourteen bit binary counter such as an MC14020B manufactured by Motorola Corp.; a dual D-type flip-flop such as an S74 device manufactured by Signetics Corp.; and an octal tri-state buffer such as an LS244, previously described, and an octal D-type flip-flop with a tri-state output such as an S374, as previously described. The timing and clock circuitry of block 110 are implemented with a conventional 555 timer, and various operational amplifiers and comparitors as known in the art.

Similarly, in FIG. 4, the multiplexor of block 126 is a conventional Dual 4-to-1 miltiplexor such as that manufactured by Signetics Corp. The MPU of block 130 is a conventional MC6809E eight-bit microprocessor unit such as that manufactured by Motorola Inc., and the DMA 131 is a conventional MC6844 Direct Memory Access Controller such as that manufactured by the Motorola Inc. The multiplexor circuitry of block 126 also includes four S153 dual 4-line-to 1-line multiplexor units, such as that manufactured by Signetics Corp., buffer 132 is a conventional tri-state octal buffers such as an LS244 device manufactured by Signetics Corp., while buffer 134 may be an AM2947 Octal 3-state bus transceiver such as that made by Advanced Micro Devices. The pull-up circuitry of block 133 is implemented with conventionally known logic circuitry.

The buffer 127 may be an AM2966 Octal dynamic memory driver such as manufactured by Advanced Micro Devices and RAM 128 may be, for example, a conventional 4164 or 6665 64K ram; such as manufactured by NEC or Motorola, Inc. Similarly, the P.E. latch of block 135 may be a conventional AM2947 Octal 3-state bus transceiver such as that manufactured by Advanced Micro Devices; the address decoder of block 136 can be a conventional 74S138 1-of-8 decoder such as that manufactured by Signetics; buffer 137 can be a conventional LS374 Octal D-type flip-flop such as that manufactured by Signetics; and the buffer 138 can be a conventional LS244 such as that manufactured by Signetics.

In FIG. 5, MPU address bus buffer 293 may be implemented with a conventional LS244 octal buffer, as previously described. The address decoder of block 294 may be a conventional MC6821 Peripheral Interface Adapter (PIA) such as that manufactured by Motorola Inc. The output of the PIA of block 294 is supplied through an address bus to each of the read only memories (ROM) or PROMs of blocks 301, 302, 303, and 304. The ROMs are PROMs may be conventional M5L 2732K erasable and re-programmable ROMs such as manufactured by Mitsubishi Japan or devices such as a conventional as 2532, a conventional 6876, a conventional 2764, or the like. The buffer 281 may be a conventional AM2947 device, as previously described, and which is coupled to the ACIA of blocks 282 and 309 and the PIAs of blocks 317 and 319. The ACIA of block 282 may be, an S6551 such as manufactured by American Micro Systems Inc., and the ACIA of block 300, may be a device The PIA circuitry of such as an MC685 Asynchronous Receiver/Transmitter made by Motorola, Inc. The PIA circuitry of blocks 312 and 319 are preferably MC6821 devices, Parallel Interface Adapters as previously described. The circuitry of blocks 383, 311, and 313 are implemented in conventional digital logic elements which are known in the art.

Lastly, FIG. 6 utilizes an AM9511 math processor such as that manufactured by Advanced Micro Devices and various associated control logic implemented in conventional logic gates, flip-flops and the like.

It will be understood that although various specific apparatus, integrated circuits, circuit configurations, programs, processes, methods and sub-routines were used to implement the preferred embodiment of the present invention, that various modifications, alterations, substitutions and equivalent circuit and programs could also be used without altering the spirit and scope of the present invention which is limited only by the appended claims.

We claim:

1. A method for recognizing an unknown, machine-readable pattern as a particular one of a group of known reference patterns comprising:
   providing a group of known reference patterns;
   computing the Fourier Transform of each of said group of known reference patterns such that each of the Fourier Transforms of each of said group of known reference patterns includes a center and a zero reference point;
   correcting the zero reference point to the center of each said Fourier Transform of each of said group of known reference patterns;
   converting the real and imaginary parts of each Fourier Transform to amplitude and phase angle form;
   correcting the converted phase angle for proper quadrature;
   providing a first memory;
   storing said corrected and converted Fourier Transformed reference patterns into a first memory;
   computing an amplitude normalization constant for each of said Fourier Transformed patterns;
   storing the computed normalization constant for each of said Fourier Transformed patterns in said first memory;
   scanning an unknown pattern to be recognized;
   generating an electrical signal indicative of said scanned unknown pattern;
   providing a second memory;
   digitizing said generated electrical signal;
   temporarily storing said digitized electrical signal in the second memory;
   retrieving said temporarily stored, digitized signal from said second memory;
   computing the Fourier Transform of each of said digitized electrical signals such that each Fourier Transform of each of said computed digitized electrical signals includes a center and a zero reference point;
   correcting the zero reference point to the center of each Fourier Transform of each of said computed digitized electrical signals indicative of said scanned unknown pattern;
   converting the real and imaginary parts of each Fourier Transform of each unknown pattern to amplitude and phase angle form;
   correcting the phase angle of each of said converted unknown patterns for proper quadrature;
   storing said corrected and converted Fourier Transformed unknown patterns into said second memory, each of said converted, Fourier Transformed unknown patterns having amplitude values with differences existing therebetween;
   computing an amplitude normalization constant for each of said Fourier Transformed unknown patterns;
   normalizing the amplitude values of the converted Fourier Transformed, unknown pattern stored in said second memory by multiplying same with said normalization constant to eliminate the absolute difference in amplitude value between the Fourier Transformed unknown pattern and each Fourier Transformed reference pattern;
   correcting for phase alignment error;
   correcting for quadrant error;
   computing the phase difference between the Fourier Transformed unknown pattern and each Fourier Transformed reference pattern;
   weighting the phase difference by the amplitude of the Fourier Transformed unknown pattern at each frequency point;
   comparing the absolute phase differences between the Fourier Transformed unknown pattern and the Fourier Transformed reference patterns;
   summing the amplitude and phase differences over all Fourier Transformed reference patterns;
   determining the best amplitude difference match between the Fourier Transformed unknown pattern and the Fourier Transformed reference pattern and the best phase difference match between the Fourier Transformed unknown pattern and the Fourier Transformed reference pattern, in combination;
   computing the average differences between the Fourier Transformed unknown pattern and the Fourier Transformed reference patterns;
   weighting the amplitude difference and phase difference, in combination, equally for each Fourier Transformed reference pattern and by the amount that they are less than the average differences, said weighted reference patterns having at least a first, and a second and minimum values; and
   locating the minimum value to identify the particular Fourier Transformed reference pattern which is the "best match" for the Fourier Transformed unknown pattern.

2. The method of claim 1 further including the steps of:
   locating a second minimum to identify the Fourier Transformed referenced pattern which is the "second best match" for the Fourier Transformed unknown pattern;
   determining the percentage by which the best match is better than the second best match; and
   utilizing the percentage by which the best match is better than the second best match as a measure of a margin of error criteria.

3. The method of claim 1 wherein the step of computing the Fourier Transform of each of said known reference patterns includes computing the real part of the Fourier Transform by the Equation $$R_u(n) = \sum_{m=0}^{N-1} X_m \cos\left(\frac{2\pi nm}{N}\right)$$

and further computing the imaginary part of the Fourier Transform by the Equation $$I_u(n) = -\sum_{m=0}^{N-1} X_m \sin\left(\frac{2\pi nm}{N}\right)$$

wherein "N" is the total number of samples in the data, $X_m$ is the mth sample that was digitized; $R_u$ is the real part of the Fourier Transform and $I_u$ is the imaginary part of the Fourier Transform.

4. The method of claim 1 wherein said step of correcting the zero reference to the center of each Fourier Transformed known reference patterns includes multiplying the real and imaginary parts of the odd points by a factor of negative one ($-1$) for shifting the zero reference from the first data point to the center of the data format.

5. The method of claim 1 wherein the step of converting the real and imaginary parts of the Fourier Transform to amplitude and phase form includes calculating the amplitude by the Equation $$A_u(n) = \sqrt{R_u(n)^2 + I_u(n)^2}$$

and calculating the phase by the Equation $$\phi_u(n) = \tan^{-1}\frac{I_u(n)}{R_u(n)}$$

where $A_u(n)$ is the amplitude and $\phi_u(n)$ is the phase angle.

6. The method of claim 1 wherein the step of correcting the phase angle for proper quadrature includes making the real and imaginary parts positive if the phase angle is in the first quadrant, for making the real part negative and the imaginary part positive if the phase angle is in the second quadrant, for making the real paret negative and the imaginary part negative if the phase angle is in the third quadrant, and for making the real part positive and the imaginary part negative if the phase angle is in the fourth quadrant so that all phase angles will range from $-180°$ to $+180°$.

7. The method of claim 1 wherein said step of computing a normalization constant for each Fourier Transformed reference pattern includes calculating the amplitude normalization constant C1 for the kth reference character by the Equation $$C1_k = \sum_{n=1}^{P} A_{RK}(n)$$

where "P" is the number of frequency points used and $A_{RK}(n)$ is the amplitude of the kth pattern at the nth frequency point.

8. The method of claim 1 wherein the step of normalizing the amplitude value of the unknown pattern by the normalization constant and for eliminating absolute amplitude differences between the unknown pattern and the known reference patterns as a factor in the recognition process is achieved via normalizing in accordance with the Equation $$A_u'(n) = A_u(n) \cdot R_k$$

where $$R_k = \frac{C1_k}{C2} \text{ and } C2 = \sum_{n=1}^{P} A_u(n)$$

9. The method of claim 1 wherein said step of computing the absolute amplitude difference between the unknown pattern and each reference pattern is computed by the Equation $$AD_k = \sum_{n=1}^{P} |A_u'(n) - A_{Rk}(n)|$$

where $A_{Rk}(n)$ is the amplitude of the kth reference pattern at the nth frequency point and $A_u(n)$ is the normalized amplitude of the unknown pattern at the nth frequency point.

10. The method of claim 1 wherein said step of correcting for phase alignment error includes subtracting a linear phase shift term from the phase function of the unknown pattern in accordance with the Equation $$\phi_2(f) = \phi_1(f) - 2\pi f \tau$$

estimating the position difference by the Equation $$\tau = \left[\frac{\phi_u(f_1) - \phi_R(f_1)}{2\pi f_1}\right]$$

where "$f_1$" is a specific frequency chosen for phase matching purposes; and where all of the phase angles of the unknown signal are adjusted by the Equation $$\phi'_u 1_u = \phi_u(f) + 2\pi f \tau$$

where "$\tau$" is found as indicated above and $\phi'_u(f)$ indicates the adjusted phase angles as a function of frequency.

11. The method of claim 10 further including the step of computing a first and a second phase correction by selecting a frequency which is higher than the previously selected frequency and calculating the phase shift by the equations which take into account the digital implementation of the method as given by:

$$\phi_{C1} = \left|\frac{\phi(n_1) - \phi_k(n_1)}{n_1}\right| \quad (1)$$

$$\phi_u'(n) = \phi_n - n\phi_{C1} \quad (2)$$

$$\phi_{C2} = \left|\frac{\phi'(n_2) - \phi_k(n_2)}{n_2}\right| \quad (3)$$

$$\phi_u''(n) = \phi'(n) - n\phi_{C2} \quad (4)$$

where "$n_1$" is the transform point chosen to estimate the first phase correction, where "$\phi'(n)$" is the phase after the first correction applied to all "n" phase values, "$n_2$" is the transform point chosen to estimate the second phase correction, and "$\phi''_u(n)$" is the phase after the second phase correction which is applied to all "n" phase values. The resulting phase angles are then adjusted to range from $-180°$ to $+180°$ by the equations:

If $\phi > +180°$, then $\phi = \phi - 360°$; and

If $\phi < -180°$, then $\phi = \phi + 360°$.

12. The method of claim 1 wherein the step of computing the absolute phase difference between the Fourier Transformed unknown pattern and the Fourier Transformed reference pattern, with the phase differences weighted by the amplitude of the unknown character at each frequency point being given by the Equation $$PD_k = \sum_{n=1}^{P} \frac{A_u(n)}{C2} \cdot |\phi_u''(n) - \phi_k(n)|$$

where the term $A_u(n)/C2$ is the amplitude weighting factor at the nth frequency and the phase difference which must be adjusted to the range $-180°$ to $+180°$ or given by the equations;

If $\phi > +180°$, then $\phi = \phi - 360°$; and

If $\phi < -180°$, then $\phi = \phi + 360°$.

13. The method of claim 12 wherein the step of summing the amplitude and phase differences includes computing the sum of the amplitude differences by the Equation $$SAD = \sum_{k=1}^{NS} AD_k$$

and computing the sum of the phase differences by the Equation $$SPD = \sum_{k=1}^{NS} PD_k$$

14. The method of claim 13 wherein the step of determining a combined amplitude and phase match value is determined for each reference pattern by the Equation $$M_k = \frac{AD_k}{SAD/NS} + \frac{PD_k}{SPD/(NS-1)}$$

where NS is the number of known reference characters and the equation essentially weights the amplitude and phase differences equally and by the amount they are less than the average differences so that a perfect match in amplitude and phase produce a value of $M_k=0$.

15. The method of claim 1 wherein said step of locating the second minimum to determine a margin of error criteria is computed by the Equation $$\% \text{ MARGIN} = \frac{MIN_2 - MIN_1}{MIN_1} \cdot 100$$

where MINhd 1 1 is the first minimum value and $MIN_2$ is the second minimum value.

16. A method for recognizing an unknown, machine-readable character as being a particular one of a group of known reference characters comprising the steps of:
providing a set of known reference characters;
Fourier Transforming the set of known reference characters;
storing the Fourier Transformed set of known reference characters in a database;
Fourier Transforming the unknown character to be recognized;
comparing the complete Fourier Transform, utilizing both the amplitude and phase portions of the Fourier Transform, of the unknown character with each of the complete Fourier Transforms including both the amplitude and phase portions, of the known reference characters to determine a best match;
further comparing the complete Fourier Transform of the unknown character with each of the complete Fourier Transforms of the reference characters to determine a second best match; and
computing the percentage difference between the second best match and the best match to provide the margin of error of the recognition process, such margin of error being usable to adjust recognition probability and false alarm rates.

17. The system for recognizing an unknown character as being a particular one of a group of known reference characters comprising;
means for scanning a media for an unknown, machine-readable character;
means for generating an electrical signal indicative of the scanned unknown character;
means for digitizing the electrical signal indicative of the scanned unknown character; and
first memory means for storing the digitized value of the unknown character;
means for introducing a group of known reference characters;
a central processing unit for controlling said scanning means used to generate the electrical signal;
video display means responsive to said central processing unit for displaying the contents of said first memory means;
a Fourier Transform processor means for:
(a) calculating the complete Fourier Transform of each of said group of known reference characters;
(b) performing amplitude spectra matching calculations;
(c) performing phase angle matching calculations;
(d) performing position correction calculations;
(d) performing phase angle corrections;
(f) calculating amplitude weighting factors for phase adjustment purposes;
(g) performing adjustments for proper quadrature;
(h) computing normalization constants for each of the known reference characters;
(i) computing the absolute amplitude difference between the complete Fourier Transformed unknown character and the complete Fourier Transformed reference characters;
(j) computing the absolute phase difference between the complete Fourier Transformed unknown character and the complete Fourier Transformed known reference characters;
(k) computing a combined amplitude and phase match value for each of the complete Fourier Transformed known reference characters;
(l) determining a minimum value indicating the "best match" between the complete Fourier Transformed unknown character and the complete Fourier Transformed known reference character;
(m) determining a second minimum value indicating a "second best match" between the complete Fourier Transformed unknown character and the complete Fourier Transformed known reference character;
(n) computing and determining a second minimum value and determining the percentage that the best match is better than the second best match; and
(o) utilizing the determined percentage as a margin of error criterion for adjusting recognition probability and the probability of false alarm rates.

18. An improved method for recognizing an unknow machine-readable character as a particular one of a group of known reference characters including computing the complete Fourier Transform of a group of unknown characters, converting both the real and imaginary part of each Fourier Transform to amplitude and phase form, correcting the phase angles for proper quadrature, computing amplitude and time base normalization constants for each Fourier Transform, computing the Fourier Transform of the digital values of the unknown characters, converting the real and imaginary parts of each Fourier Transform of each of said unknown characters into amplitude and phase form, wherein the improvement comprises the steps of:
(a) normalizing the amplitude value of each of the unknown characters by a normalization constant to eliminate the absolute amplitude between unknown and known reference characters;
(b) computing the amplitude difference between unknown characters and each known reference character;
(c) computing a first and second phase correction;
(d) computing the absolute phase difference between each unknown character and each of the known reference characters;
(e) summing the amplitude and phase differences; and
(f) determining the combined amplitude and phase match value for a "best match" to indicate which of the group of known reference characters corresponds to the unknown character.

19. The improved method of claim 18 further including the steps of:
locating a second best match value;
subtracting the difference between the values of the best match and the second best match derived from the combined amplitude and phase terms of said Fourier Transforms;
dividing said difference by the best match value to determine the percent margin between the best match value and the second best match value;
comparing said percent margins to predetermined recognition margin criteria which can be adjusted to provide the desired probability of correct recognitions versus incorrect recognitions and also to adjust the probability of no recognition.

20. The improved method of claim 18 wherein the step of normalizing the amplitude value of the unknown character by a normalization constant to eliminate the absolute amplitude between the unknown character and the known reference character as a factor in the recognition product process is achieved by use of the Equation $$A_u'(n) = A_u(n) \cdot R_k$$

where $$R_k = \frac{C1_k}{C2} \text{ and } C2 = \sum_{n=1}^{P} A_u(n)$$

for all "n" points used.

21. The improved method of claim 20 wherein said step of computing the absolute amplitude difference between the unknown pattern and each reference pattern is obtained by use of the Equation $$AD_k = \sum_{n=1}^{P} |A_\mu'(n) - A_{RK}(n)|$$

where $A_{Rk}(n)$ is the amplitude of the nth reference pattern at the uth frequency point and $A'_u(n)$ is the amplitude of the unknown pattern at the nth frequency point.

22. The improved method of claim 21 wherein said step of computing a first and second phase correction includes, computing a first phase correction by the Equations $$\phi_{C1} = \left| \frac{\phi(n_1) - \phi_k(n_1)}{n_1} \right| \text{ and } \phi_\mu'(n) = \phi(n) - n \cdot \phi_{C1}$$

where $n^1$ is the transform point chosen to estimate the first phase correction, where the $\phi(n_1)$ is the first phase correction applied to all "n" phase values.

23. The improved method of claim 22 wherein said step of computing the first and second phase correction includes the step of computing the second phase correction by selecting a frequency which is higher than the previously selected frequency used to compute the first phase correction and calculating the phase shift of the second phase shift by the Equations $$\phi_{C2} = \left| \frac{\phi'(n_2) - \phi_k(n_2)}{n_2} \right| \text{ and } \phi''(n) = \phi'(n) - n \cdot \phi_{C2}$$

where "$n_2$" is the transformation point chosen to estimate the second phase correction and the second phase correction $\phi(n_2)$ is applied to all "n" phase values to effectively divide the unknown character relative to the known characters before computing the Fourier Transform of both characters so that after the phase correction, the resulting phase angles are adjusted to a range between $-180°$ to $+180°$.

24. The improved method of claim 23 wherein the step of computing the absolute phase difference between the unknown character and the known reference character, with the phase differences weighted by the amplitude of the unknown character at each frequency point is given by the Equation $$PD_k = \sum_{n=1}^{P} \frac{A_\mu(n)}{C2} \cdot |\phi_\mu''(n) - \phi_k(n)|$$

where the term $A_u(n)/C2$ is the amplitude weighting factor at the nth frequency and since the Equation $$C2 = \sum_{n=1}^{P} A_\mu(n) \text{ and } \Delta P = |\phi_\mu''(n) - \phi_k(n)|$$

the phase difference which must be adjusted to range from $-180°$ to $+180°$ is calculated by the Equations If $\phi > +180°$, then $\phi = \phi - 360°$ and If $\phi < -180°$, then $\phi = \phi + 360°$.

25. The improved method of claim 24 wherein the step of summing the amplitude and phase differences includes computing the sum of the absolute differences by the Equation $$SAD = \sum_{k=1}^{NS} AD_k$$

and then computing the sum of the phase differences by the Equation $$SPD = \sum_{k=1}^{NS} PD_k$$

26. The improved method of claim 25 wherein the step of determining the combined amplitude and phase match value is determined for each reference character by the Equation $$M_k = \frac{AD_k}{SAD/NS} + \frac{PD_k}{SPD/(NS-1)}$$

where NS is the number of known reference characters and the equation essentially weights the amplitude and phase differences equally and by the amount that they are less than the average differences so that a perfect match in amplitude and phase produces a value of $M_k=0$.

27. The improved method of claim 26 further including the step of locating the second minimum to determine the margin of error criteria by use of the Equation $$\% \text{ MARGIN} = \frac{MIN_2 - MIN_1}{MIN_1} \cdot 100$$

where $MIN_1$ is the minimum value and $MIN_2$ is the second minimum value.

* * * * *